2,908,644

LUBRICATING GREASES THICKENED WITH METAL SALTS OF SULFONATED HYDROXY AZO COMPOUNDS

Norman R. Odell, Fishkill, and Joseph F. Lyons, Poughkeepsie, N.Y., assignors to Texaco Inc., a corporation of Delaware No Drawing. Application November 25, 1957
Serial No. 698,341

10 Claims. (Cl. 252—33.2)

This invention relates to improved lubricating greases and to a novel class of thickening agents therefor. More particularly, it relates to lubricating greases thickened with polyvalent metal salts of sulfonated hydroxy azo compounds.

The polyvalent metal salts of sulfonated aryl azo naphthol compounds comprise a class of high melting compounds which are employed extensively as pigments, particularly in the graphic arts. We have now found that these compounds when dispersed in lubricating oils in suitable proportions form stable gels of grease-like consistency and very superior lubricating properties generally.

The compounds which are employed as grease thickening agents in accordance with this invention are represented by the formula Ar—N=N—Ar', wherein Ar is an aryl group selected from the class consisting of phenyl and naphthyl groups and substituted phenyl and naphthyl groups and Ar' is a naphthol group or a substituted naphthol group, at least one of the groups represented by Ar and Ar' containing at least one —$SO_3M$ group, wherein M is the hydrogen equivalent of a polyvalent metal, such as the alkaline earth metals, Al, Mn, Pb, Mg, Fe, etc. Ar and Ar' may also contain other substituents of various types such as alkyl, aryl, alkaryl, and aralkyl groups, —OR, —COOR, —OH, —$NO_2$, —$NH_2$, —NHR, —NRR', halogens, etc., where R and R' are alkyl, aryl, alkaryl or aralkyl groups.

The preferred compounds of the above class are polyvalent metal salts of monosulfonated compounds. Particularly suitable compounds which are commercially available include the following:

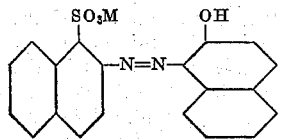

Ca, Sr and Ba salts of 2(2'-hydroxy-1'-naphthylazo)-1-naphthalenesulfonic acid.

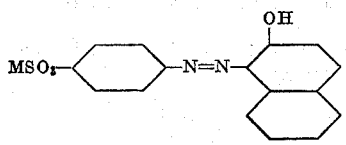

Al salt or lake on alumina hydrate or Ba salt of 4(2'-hydroxy-1'-naphthylazo) benzenesulfonic acid.

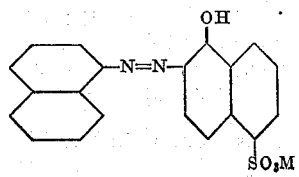

Ca and Mn salts of 6(1'-naphthylazo)-5-hydroxy-1-naphthalenesulfonic acid.

Additional examples of suitable compounds which are employed as grease thickening agents in accordance with this invention include the following: Ca salt of 5-(4'-sulfo-1'-naphthylazo)-6-hydroxy-2-naphthalenesulfonic acid; Ba salt of 2-(4'-sulfo-1'-naphthylazo)-1-hydroxy-3,6-naphthalenedisulfonic acid; Ba salt of 6-(4'-hydroxy-1'-naphthylazo)-2-naphthalenesulfonic acid; Pb salt of 1-(2',4'-xylylazo)-2-hydroxy-3,6-naphthalenedisulfonic acid; Mn salt of 2-(2'-hydroxy-1'-naphthylazo)-5-chloro-4-methyl-benzenesulfonic acid; Ba salt of 4-(2'-hydroxy-1'-naphthylazo)-2-methylbenzenesulfonic acid.

The above compounds are either commercially available or readily obtainable by well known methods, such as by coupling naphthols or naphthols containing one or more sulfonate groups with diazonium salts to form the corresponding dye and then converting this to the insoluble pigment by precipitation with a suitable polyvalent metal compound. A substrate such as alumina, titania, blanc fixe, etc., may be employed in the precipitation, or the pigment may be mixed with a material of this character to form a so-called extended toner. Where such materials are merely mixed with the pigment, they are generally employed in amounts less than about 25 percent by weight, and preferably in amounts less than about 10 percent by weight, based on the weight of the finished pigment. However, when the inorganic material is employed as a substrate, the amount present is not critical provided that sufficient of the pigment is present to substantially cover its surface, and the composition may comprise high proportions, such as up to about 80 percent by weight or even higher, of such inorganic material. The compounds may also be employed in the resinated form, obtained by co-precipitating a solution of resin soap and dye by means of a polyvalent metal compound, as described, for example, in U.S. 1,772,300. The finished pigment obtained in this manner may suitably comprise from about 5 to about 30 percent by weight of polyvalent metal resin soap.

The greases of this invention comprise essentially lubricating oils admixed with materials of the above type in finely divided form, suitably in the form of particles below about 5 microns in diameter, in sufficient amounts to thicken the lubricating oil to a grease consistency. Ordinarily, the composition will contain from about 5 to about 45 percent by weight of the finely divided solid, and preferably from about 15 to about 35 percent by weight, based on the weight of the composition.

The lubricating oils employed in these greases may be any oils of lubricating characteristics such as are ordinarily employed in lubricating greases, including the conventional mineral lubricating oils, synthetic oils obtained by various refinery processes such as cracking and polymerization, and other synthetic oleaginous compounds, such as high molecular weight ethers, esters, silicones, etc. Suitable mineral oils include paraffinic and naphthenic oils having viscosities in the range from about 80 seconds Saybolt Universal at 100° F. to about 225 seconds Saybolt Universal at 210° F., and preferably having viscosities in the range from about 100 to about 600 seconds Saybolt Universal at 100° F. Synthetic oils, including particularly the dicarboxylic acid esters, may be employed very advantageously for preparing greases suitable for use at elevated temperatures.

A particularly suitable class of dicarboxylic acid ester oils is that disclosed by R. T. Sanderson in U.S. 2,628,-974, obtained by reacting a dibasic aliphatic acid with a glycol and end blocking the reaction product with a monohydric aliphatic alcohol or a monocarboxylic aliphatic acid. The preferred materials of this character are products obtained by reacting a mono- or polyalkylene glycol with a dicarboxylic acid and a monohydric alcohol, represented by the formula $$R_2—OOC—R_1—COO—(R—OOC—R_1—COO)_x—R_2$$

where R is an aliphatic hydrocarbon group or an aliphatic ether group containing from 4 to 12 carbon atoms, $R_1$ and $R_2$ are aliphatic hydrocarbon groups containing from 1 to 12 carbon atoms and $x$ is an integer from 1 to 5. Preferably, R is an aliphatic hydrocarbon group or an aliphatic ether group containing from 6 to 12 carbon atoms in branched chain arrangement, $R_1$ is an alkylene group containing from 7 to 8 carbon atoms, $R_2$ is an alkyl group containing from 4 to 9 carbon atoms in branched chain arrangement and $x$ is 1 or 2. An ester of this type may very effectively comprise from about 20 up to 100 percent of the oil component of the grease, the remainder being mineral oil or other oil of a different type.

Additives of the usual types may be employed in these greases, such as, for example, oxidation inhibitors, corrosion inhibitors, tackiness agents, extreme pressure agents, etc. Oxidation inhibitors of the amine type, such as diphenylamine, alpha-naphthylamine, beta- naphthylamine and para-phenylenediamine are especially suitable. The composition may contain from about 0.1 percent to about 5 percent by weight of a compound of this type. The inhibitor combination described in U.S. 2,663,691, comprising N,N'-diphenyl para-phenylenediamine dissolved in about 3 times its weight of tricresyl phosphate, may very advantageously be employed. Also, additional thickening agents may be employed, such as other finely divided solids of various types and metal soaps of high molecular weight fatty acids such as are conventionally employed in lubricating greases.

The grease preparation may be carried out by merely mixing together the thickener and any additives employed with the lubricating oil, employing any means suitable for accomplishing a thorough dispersion of the thickener and additives in the lubricating oil base, such as by milling in a colloid mill or in a paint mill. The mixing may be carried out at ordinary temperatures or at elevated temperatures up to about 300° F. or higher, if desired, in order to dissolve the additives.

The following examples are given for the purpose of more fully disclosing the invention.

EXAMPLE I

A lubricating grease representative of the greases of this invention is obtained by thickening a mineral lubricating oil with 30 percent by weight based on the weight of the composition of the pigment known as Persian Orange. The pigment is prepared by precipitating 4-(2'-hydroxy-1'-naphthylazo) benzenesulfonic acid (Orange II) upon aluminum hydrate by the method described by A. Voet, Journal of Physical Chemistry, vol. 47, pages 191-6 (1943), which comprises heating one molar aqueous solution of the dye with aluminum hydrate for at least about 3 hours, while the pH is maintained at 6.5–5.5. The pigment obtained under these conditions contains about 40–45 percent by weight of the organic component, and has been shown to comprise a mixture of the aluminum salt of the dye and an adsorption complex with the aluminum hydrate. It is employed in the form of particles below about 2 microns in diameter and having a measured surface area of about 33 square meters per gram.

The mineral lubricating oil is a refined naphthenic distillate oil having a Saybolt Universal viscosity at 100° F. of about 330 seconds.

The grease preparation is carried out by mixing together the oil and pigment in suitable proportions, employing an electric mixer, and then passing the mixture through a Premier colloid mill with two passes at 0.002 inch clearance.

The grease prepared as described above is an N.L.G.I No. 1 grade grease having a buttery texture and a dropping point above 500° F. It has very superior lubricating properties generally, including excellent oxidation resistance, as shown by a pressure drop of only 3 lbs. after 100 hours at 210° F. in the A.S.T.M. bomb oxidation test.

EXAMPLE II

Another lubricating grease representative of the greases of this invention is obtained by thickening a mineral lubricating oil with 30 percent by weight based on the composition of a resinated calcium lithol pigment. The pigment comprises about 25 percent by weight of calcium resinate, and is obtained by co-precipitating a mixture of the sodium salt of 2-(2'-hydroxy-1'-naphtylazo)-1-naphthalenesulfonic acid and sodium resinate, comprising chiefly sodium abietate, as described in Example I of U.S. 1,772,300. The pigment is employed in the form of a mixture of particles of 0.05 x 0.3 microns and and of 0.2 x 2 microns in size, and has a measured surface area of 57 square meters per gram.

The mineral lubricating oil comprises a mixture in about a 1:6 ratio by weight of a refined paraffinic distillate oil having a Saybolt Universal viscosity at 100° F. of about 330 seconds and a refined paraffinic residual oil having a Saybolt Universal viscosity at 210° F. of about 119 seconds. The grease also contains 1 percent by weight of N,N' diphenyl para-phenyldiamine and 3 percent by weight of tricresyl phosphate.

The grease preparation is carried out as described in Example I, the inhibitors being incorporated by first dissolving the amine in the tricresyl phosphate and adding the solution to the grease mixture before milling.

A soft glossy red grease of N.L.G.I. No. 2 grade is obtained having a dropping point above 500° F.

EXAMPLE III

A grease is prepared employing the same thickener as described in Example II in a lubricating oil which is a synthetic ester having the formula (iso—$C_8H_{17}$)—OOC—$(CH_2)_8$—COO—iso
  —$C_8H_{16}$—OOC—$(CH_2)_8$—COO—(iso—$C_8H_{17}$)

The grease preparation is carried out as described in Example I.

A smooth red N.L.G.I. No. 1 grade grease is obtained having a dropping point above 500° F.

EXAMPLE IV

Another grease representative of the grease of this invention is obtained by thickening a mineral lubricating oil of the character described in Example I with 30 percent by weight, based on the composition, of a resinated barium lithol pigment, obtained as described in Example II except that barium chloride is employed as the precipitating agent. The pigment is employed in the form of particles below about 2 microns in diameter.

The grease preparation is carried out as described in Example I.

A smooth red N.L.G.I. No. 0 grade grease is obtained having a dropping point above 500° F.

EXAMPLE V

Another grease representative of the greases of this invention is obtained by thickening a mineral lubricating oil of the character described in Example I with the calcium salt of 6-(1'-naphthylazo)-5-hydroxy-1-naphthalenesulfonic acid (Helio Bordeaux BL). The latter is employed in the form of particles below 2 microns in diameter and having a measured surface area of about 65.

The grease preparation is carried out as described in Example I.

A smooth reddish brown N.L.G.I. No. 1 grade grease is obtained having a dropping point above 500° F.

Greases obtained as described in the above examples have been found to possess a combination of very desirable lubricating properties, including particularly good shear stability and excellent water resistance properties in addition to good texture and appearance and high dropping points as disclosed above. Table I below shows, for example, the shear resistance properties of greases prepared as described in Examples I, III and IV as determined by the ASTM worker test.

*Table I*

ASTM WORKER TEST

| Grease | ASTM Penetration | |
| --- | --- | --- |
| | after 60 strokes | after 100,000 strokes |
| Example I | 346 | 355 |
| Example III | 337 | 343 |
| Example IV | 357 | 345 |

Table II below shows the water resistance characteristics of greases prepared as described in Example I and IV.

*Table II*

| Example No. | I | IV |
| --- | --- | --- |
| Dynamic Water Resistance Test, percent loss | 2.5 | 0 |
| Water Absorption Test: | | |
| Water absorption, percent | 65 | 80 |
| Penetration before test,[1] Unworked | 261 | 274 |
| Penetration after test,[1] Unworked | 224 | 246 |

[1] Converted from ½ size cone.

As shown by the above tables, greases prepared in accordance with this invention possessed a combination of very high shear stability and excellent water resistance properties, being both highly resistant to washing away as well as to breakdown or change in consistency after absorption of relatively large amounts of water. This combination of properties is difficult to obtain in solids thickened greases, which are generally characterized by either inferior shear stability or poor water resistance properties. For example, a grease comprising a similar mineral lubricating oil thickened with finely divided silica, having a measured surface area of about 95 square meters per gram, gives a 100 percent loss in the dynamic water resistance test.

In addition, greases are obtainable in accordance with this invention having moderately good high temperature performance properties, which are generally superior to those obtained with the conventional solid thickening agents, although inferior to those obtainable with certain very expensive organic pigments. Table III below shows the high temperature performance properties of a grease prepared as described in Example II.

*Table III*

| Grease | High Temperature Performance Test— Hours at 350° F. |
| --- | --- |
| Example II | 177 |

The high temperature performance test of the foregoing table is a test for determining the performance characteristics of greases in anti-friction bearings at elevated temperatures and high rotative speeds. The test is carried out as described, for example, in U.S. 2,791,569, column 5, lines 29 to 65. It consists essentially in rotating a test bearing maintained at the test temperature and lubricated with the grease under test at 10,000 r.p.m. until the lubricant fails, which is indicated by the rupture of a low amperage fuse in the driving motor circuit. The 177 hours obtained in this test with the pigment thickened grease of this invention is considerably higher than the results obtained with mineral oil base greases thickened with inorganic solids such as silica or carbon black, and also to those obtained with mineral oil base greases thickened with other organic pigments which have been employed heretofore as grease thickening agents, such as indigo and copper phthalocyanine.

Obviously many modifications and variations of the invention, as hereinbefore set forth, may be made without departing from the spirit and scope thereof and therefore, only such limitations should be imposed as are indicated in the appended claims.

We claim:
1. A lubricating grease consisting essentially of a lubricating oil thickened to a grease consistency with a high melting monoazo compound selected from the class consisting of polyvalent metal salts of sulfonated benzene-azo-naphthol compounds and naphthalene-azo-naphthol compounds containing 1–3 polyvalent metal sulfonate groups, and substituted derivatives of such compounds wherein the substituent groups are substantially neutral non-oil solubilizing groups.
2. A lubricating grease according to claim 1 wherein the said metal is chosen from the group consisting of alkaline earth metals and aluminum.
3. A lubricating grease according to claim 1 wherein the said sulfonated compounds are monosulfonated compounds.
4. A lubricating grease according to claim 1 wherein the said compounds are beta-naphthol compounds.
5. A lubricating grease consisting essentially of a lubricating oil thickened to a grease consistency with a monoazo compound selected from the class consisting of polyvalent metal salts of monosulfonated benzene-azo-2-naphthols and monosulfonated naphthalene-azo-2-naphthols, said polyvalent metal being selected from the class consisting of alkaline earth metals and aluminum.
6. A lubricating grease according to claim 5 wherein the said compound is a salt of 2(2′-hydroxy-1′-naphthylazo)-1-naphthalenesulfonic acid.
7. A lubricating grease according to claim 5 wherein the said compound is a salt of 4(2′-hydroxy-1′-naphthylazo) benzenesulfonic acid.
8. A lubricating grease according to claim 5 wherein the said compound is precipitated upon aluminium hydrate.
9. A lubricating grease according to claim 5 wherein the said compound is combined with about 5–30 percent by weight of a polyvalent metal resinate.
10. A lubricating grease according to claim 5 containing 0.1 to 50 percent by weight of N,N′-diphenylparaphenylenediamine and about 0.3–15 percent by weight of tricresyl phosphate.

References Cited in the file of this patent

UNITED STATES PATENTS 2,848,417   Armstrong et al. _____ Aug. 19, 1958

UNITED STATES PATENT OFFICE

CERTIFICATE OF CORRECTION

Patent No. 2,908,644                                                         October 13, 1959

Norman R. Odell et al

It is hereby certified that error appears in the printed specification of the above numbered patent requiring correction and that the said Letters Patent should read as corrected below.

Column 6, line 60, for "50 percent" read -- 5.0 percent --.

Signed and sealed this 5th day of April 1960.

(SEAL)
Attest:

KARL H. AXLINE                                        ROBERT C. WATSON
Attesting Officer                                       Commissioner of Patents